United States Patent
Lei et al.

(10) Patent No.: US 12,488,012 B2
(45) Date of Patent: Dec. 2, 2025

(54) QUERY RELAXATION USING EXTERNAL DOMAIN KNOWLEDGE FOR QUERY ANSWERING

(71) Applicant: INTERNATIONAL BUSINESS MACHINES CORPORATION, Armonk, NY (US)

(72) Inventors: Chuan Lei, Cupertino, CA (US); Fatma Ozcan, San Jose, CA (US); Dorian Boris Miller, Saratoga, CA (US); Jeffrey Kreulen, San Jose, CA (US); Rebecca Geis, Niedersteinbach (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 128 days.

(21) Appl. No.: 18/500,083

(22) Filed: Nov. 1, 2023

(65) Prior Publication Data
US 2024/0061850 A1  Feb. 22, 2024

Related U.S. Application Data

(62) Division of application No. 16/537,496, filed on Aug. 9, 2019, now Pat. No. 11,841,867.

(51) Int. Cl.
*G06F 16/00* (2019.01)
*G06F 16/22* (2019.01)
(Continued)

(52) U.S. Cl.
CPC ...... *G06F 16/2465* (2019.01); *G06F 16/2272* (2019.01); *G06F 16/2372* (2019.01);
(Continued)

(58) Field of Classification Search
CPC ............ G06F 16/2272; G06F 16/2372; G06F 16/24522; G06F 16/2465; G06F 16/2468;
(Continued)

(56) References Cited

U.S. PATENT DOCUMENTS

| | | |
|---|---|---|
| 7,734,565 B2 | 6/2010 | Carnahan |
| 8,458,165 B2 | 6/2013 | Liao et al. |

(Continued)

FOREIGN PATENT DOCUMENTS

| | | |
|---|---|---|
| CN | 102156726 A | 8/2011 |
| CN | 105677822 A | 6/2016 |

(Continued)

OTHER PUBLICATIONS

Decision to Grant issued Feb. 6, 2024 in related Japanese Patent Application No. 2022-507832, 2 pgs.
(Continued)

*Primary Examiner* — Diedra McQuitery
(74) *Attorney, Agent, or Firm* — Intelletek Law Group, PLLC; Gabriel Daniel, Esq.

(57) ABSTRACT

An offline adaptation method of customizing and incorporating external knowledge domain specific knowledge sources into an existing knowledge base (KB) of a cognitive conversation system, includes obtaining an instance-concept frequency from the existing KB. All the contexts of a domain ontology in which an instance-concept is used are computed. All instance-concepts from the existing KB to an external domain-specific knowledge source are mapped. The existing KB is configured to search for semantically related terms in response to a natural language query received from a conversation system.

10 Claims, 12 Drawing Sheets

(51) Int. Cl.
*G06F 16/23* (2019.01)
*G06F 16/2452* (2019.01)
*G06F 16/2458* (2019.01)
*G06F 16/3329* (2025.01)
*G06F 16/84* (2019.01)
*G06N 5/02* (2023.01)

(52) U.S. Cl.
CPC .... *G06F 16/24522* (2019.01); *G06F 16/2468* (2019.01); *G06F 16/3329* (2019.01); *G06F 16/84* (2019.01); *G06N 5/02* (2013.01)

(58) Field of Classification Search
CPC .. G06F 16/3322; G06F 16/3329; G06F 16/84; G06N 5/02; G06N 20/00
See application file for complete search history.

(56) References Cited

U.S. PATENT DOCUMENTS

| | | | |
|---|---|---|---|
| 8,458,180 | B2 | 6/2013 | Gossel |
| 9,396,492 | B2 | 7/2016 | Schiff et al. |
| 11,120,059 | B2 | 9/2021 | Chang |
| 11,263,277 | B1 | 3/2022 | Podgorny |
| 11,526,720 | B2 | 12/2022 | Yonekura |
| 2007/0022099 | A1 | 1/2007 | Yoshimura |
| 2008/0288480 | A1 | 11/2008 | Yahia |
| 2013/0007124 | A1 | 1/2013 | Sweeney |
| 2013/0246392 | A1 | 9/2013 | Farmaner |
| 2016/0042058 | A1 | 2/2016 | Nguyen |
| 2016/0179945 | A1 | 6/2016 | Lastra Diaz |
| 2016/0321357 | A1 | 11/2016 | Novacek |
| 2017/0160813 | A1* | 6/2017 | Divakaran ............. G06N 3/006 |
| 2017/0223190 | A1 | 8/2017 | Mandel |
| 2018/0232359 | A1* | 8/2018 | Crudele ................. G06F 40/30 |
| 2018/0232376 | A1 | 8/2018 | Zhu |
| 2020/0004873 | A1 | 1/2020 | Chang |
| 2020/0234217 | A1* | 7/2020 | Arora ............... G06Q 10/06393 |
| 2021/0042304 | A1 | 2/2021 | Lei et al. |

FOREIGN PATENT DOCUMENTS

| | | |
|---|---|---|
| CN | 107797984 A | 3/2018 |
| CN | 107861951 A | 3/2018 |
| CN | 109582761 A | 4/2019 |
| CN | 107609101 B | 10/2020 |
| CN | 114222984 A | 3/2022 |
| DE | 112020003141 T5 | 3/2022 |
| GB | 201902764 | 9/2019 |
| GB | 2601936 A | 6/2022 |
| JP | H11265400 A | 9/1999 |
| JP | 2006293731 A | 10/2006 |
| JP | 2017224190 A | 12/2017 |
| JP | 2019095940 A | 6/2019 |
| JP | 2022-543324 A | 10/2022 |
| WO | 2018222448 A1 | 12/2018 |
| WO | 2021/028776 A1 | 2/2021 |

OTHER PUBLICATIONS

Elbassuoni, S. et al., "Query Relaxation for Entity-Relationship Search"; Max-Planck Institute for Informatics (2010); 45 pgs.
Anonymous, "Continuous Improved Conversation Entities"; IP.Com (Jul. 2018); 4 pgs.
Anonymous, "Cognitive Search Leveraging Quality Score Generated from Social Collaborations Around Selected Artifacts for Answering Questions in Cognitive Conversational Systems"; IP.Com (Aug. 2018); 4 pgs.
Anonymous, "Adapting Conversation Based on Perceived User Expertise"; IP.Com (Apr. 2019); 5 pgs.
McInnes, B. T., et al., "U-path: An Undirected Path-Based Measure of Semantic Similarity"; AMIA Annu Symp Proc (2014); pp. 882-891.
Mell, P. et al., "Recommendations of the National Institute of Standards and Technology"; NIST Special Publication 800-145 (2011); 7 pgs.
Nambiar, U. et al., "Answering Imprecise Queries Over Web Databases"; Proceedings of the 31st VLDB Conference, Trondheim, Norway (2005); 4 pgs.
Yahya, M. Question Answering and Query Processing for Extended Knowledge Graphs; Dissertation; Saarbrucken, Germany (2016); 172 pgs.
International Search Report and Written Opinion from related application PCT/IB2020/057335 dated Nov. 19, 2020; 8 pgs.
List of IBM Patents or Patent Applications Treated as Related, Appendix P, 2 pgs. Nov. 1, 2023.
McInnes et al. "U-path: An undirected path-based measure of semantic similarity", AMIA Annu Symp Proc. 2014, Nov. 14, p. 882-891, https://www.ncbi.nlm.nih.gov/pmc/articles/PMC4419983/ (Year: 2014).

* cited by examiner

Radius-based Approach

| Term | Radius |
|---|---|
| 1 Chronic kidney disease | 1 |
| 2 Kidney disease | 1 |
| 3 Acute renal failure | 1 |
| 4 Renal failure | 1 |
| 5 Postoperative renal failure | 2 |
| 6 End stage renal disease | 2 |
| 7 Disorder of transplanted kidney | 2 |
| 8 Renal hematuria | 2 |
| 9 Renal abscess | 2 |
| 10 Disease due to Polyomavirus | 2 |
| 11 Infectious disorder of kidney | 2 |
| 12 Acute renal failure | 2 |
| 13 Infectious disease of abdomen | 2 |
| 14 Papillary necrosis | 2 |
| 15 Injury of kidney | 2 |
| 16 Mental retardation | 2 |
| 17 Viral hemorrhagic fever | 2 |
| 18 Milk alkali syndrome | 2 |
| 19 Heart failure | 2 |
| 20 Pyelitis | 2 |
| More... | |

Hybrid Approach

| Term | Similarity | Radius |
|---|---|---|
| Renal failure | 0.958236237 | 1 |
| Chronic kidney disease | 0.909619136 | 1 |
| Acute renal failure | 0.90137074 | 1 |
| Chronic renal failure | 0.878469181 | 2 |
| Anemia of chronic renal failure | 0.868719602 | 3 |
| Chronic kidney disease stage 5 | 0.861707916 | 2 |
| Chronic kidney disease stage 5 on dialysis | 0.830894277 | 3 |
| Hemolytic uremic syndrome | 0.829788843 | 3 |
| Milk alkali syndrome | 0.825309023 | 2 |
| Postoperative renal failure | 0.798576705 | 2 |
| Hepatorenal syndrome | 0.796443707 | 3 |
| End stage renal disease | 0.786150769 | 2 |
| Disorder of the genitourinary system | 0.646803163 | 3 |
| Focal segmental glomerulosclerosis | 0.622253858 | 3 |
| Pyelonephritis | 0.621913073 | 3 |
| Infectious disease of abdomen | 0.557964711 | 2 |
| Urinary tract infectious disease | 0.540395781 | 3 |
| Intestinal infectious disease | 0.530129834 | 3 |

FIG. 7

Radius-based Approach

| Term | Radius |
|---|---|
| 1 Endogenous depression | 1 |
| 2 Severe depression | 1 |
| 3 Dysthymia | 1 |
| 4 Major depressive disorder | 1 |
| 5 Reactive depression (situational) | 1 |
| 6 Drug-induced depressive state | 1 |
| 7 Mood disorder | 2 |
| 8 Mental disorder | 2 |
| 9 Personality disorder | 2 |
| 10 Psychotic disorder | 2 |
| 11 Depressed bipolar I disorder | 2 |
| 12 Schizoaffective disorder | 2 |
| 13 Postoperative complication | 2 |
| 14 Premenstrual dysphoric disorder | 2 |
| 15 Bipolar disorder | 2 |
| 16 Seasonal affective disorder | 2 |
| 17 Postpartum depression | 2 |
| 18 Postoperative hemorrhage | 3 |
| 19 Corneal flap fold | 3 |
| 20 Postoperative cardiac complication | 3 |
| More... | |

Hybrid Approach

| Relaxed Term | Radius | Similarity |
|---|---|---|
| | 1 | 0.905280075 |
| | 2 | 0.890872163 |
| Premenstrual dysphoric disorder | | |
| Seasonal affective disorder* | 2 | 0.870709676 |
| Depressed bipolar I disorder* | 2 | 0.865522863 |
| Severe depression* | 1 | 0.848717264 |
| | 1 | 0.846385192 |
| | 1 | 0.838585814 |
| | 3 | 0.830682679 |
| Reactive depression (situational)* | 1 | 0.823395697 |
| | 2 | 0.819962927 |
| | 1 | 0.812154159 |

FIG. 8

QUERY RELAXATION USING EXTERNAL DOMAIN KNOWLEDGE FOR QUERY ANSWERING

BACKGROUND

Technical Field

The present disclosure generally relates to systems and methods for domain-specific knowledge bases (KB). More particularly, the present disclosure relates to domain-specific conversational systems utilizing query relaxation to understand natural language questions/queries.

Description of the Related Art

Today, conversational systems are increasing in popularity as a simple and natural way to interact with various types of applications and data. Such systems are widely used to interact with various domain-specific knowledge bases (KBs), including finance, healthcare, entertainment, just to name a few of many KBs in existence.

SUMMARY

According to various embodiments, a computing device, a non-transitory computer readable storage medium, and a method are provided for a query relaxation method that leverages external knowledge sources (a domain-specific external knowledge source) to expand the domain vocabulary for domain-specific conversational systems.

According to an embodiment, a non-transitory computer readable storage medium tangibly embodying a computer readable program code having computer readable instructions that, when executed, cause a computer device to execute a method of query relaxation. The method includes the operations of receiving a query from a conversational system. At least one search term is identified in the query in the relaxation method. Instance data is output data to the conversational system in response to determining that the instance data in data stores matches at least one search term in the query.

The received query to an external domain-specific knowledge source is output in response to determining that the one search term does not match instance data in the data stores. The computer device receives the relaxed data matches from the external domain-specific knowledge source, which are semantically related to at least one search term in the query based on a plurality of criteria. The computer device generates a response to the query based on contextual information and structural information.

In an embodiment, the plurality of criteria of the semantically-related terms received by the computer device are based on structural information obtained from the external domain-specific knowledge source, the contextual information obtained from the query, and information content of the text corpus from where the knowledge base is curated.

According to an embodiment, a system configured to perform query relaxation includes a plurality of data stores. A translation index is configured to receive a query from a conversational system, provides instance data indexed to data values stored in the data stores and semantically related terms, identify at least one search term in the query; and output instance data to the conversational system when the data in the data stores matches the at least one search term in the query. An external domain-specific knowledge index is configured to receive the query from the translation index when there is no match in the data stores of the at least one search term. The external domain-specific knowledge index is further configured to output the received query to an external domain-specific knowledge source, and to receive from the external domain-specific knowledge source relaxed data semantically related to at least one search term in the query. The relaxed data is based on contextual information and structural information associated with the query. In addition, the system generates a response to the query based on contextual information and structural information.

In one embodiment, the external domain-specific knowledge source includes data in a form of one or more of taxonomies, ontologies, or semantic networks.

According to an embodiment, a computer-implemented method of performing query relaxation includes receiving, by a computer device, a query output from a conversational system. At least one search term in the query is identified by the computer device. Instance data is output to the conversational system in response to determining that the instance data in a data store storage matches the at least one search term in the query. The computer device outputs the received query to an external domain-specific knowledge source in response to determining that the at least one search term does not the match instance data in the data store. The computer device receives the relaxed data matches from the external domain-specific knowledge source being semantically-related to at least one search term in the query based on a plurality of criteria associated with the query. The computing device generates a response to the query based on contextual information and structural information.

According to an embodiment, an offline adaptation method of customizing and incorporating external knowledge domain specific knowledge sources into an existing knowledge base (KB) of a cognitive conversation system. The method includes obtaining an instance-concept frequency from the existing KB. All the contexts where a domain ontology in which an instance-concept is used are computed. All the instance-concepts are mapped from the existing KB to the external domain-specific knowledge source. The existing KB is configured to search for semantically related terms in response to a natural language query received from a conversation system.

According to an embodiment, a computer-implemented method for leveraging information content in an existing knowledge base (KB) configured to search for semantically related terms utilizing query relaxation in response to a natural language query includes assigning different weights to isA and hasA relationships in an external domain-specific knowledge source. A weight of a path is calculated connecting two instance concepts c1 (search concept) and c2 (related concept) according to the following:

$$p_{c_1,c_2} = \prod_{i}^{|D|} w_i^{D-i}$$

where:
  a distance between instance concept c1 and related concept c2 is $|D|$, and
  $w_i$ is the weight of the $i^{th}$ relationship from c1 to c2.
The results for the calculated weight of a path for each two instance concepts are based on similarity scores, and the relaxed results are output in which the similarity scores are a highest range of results.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIGS. 7 and 8 are illustrative examples comparing the hybrid approach of the present disclosure with a radius-based approached, consistent with an illustrative embodiment.

DETAILED DESCRIPTION

Overview

Figure 1:
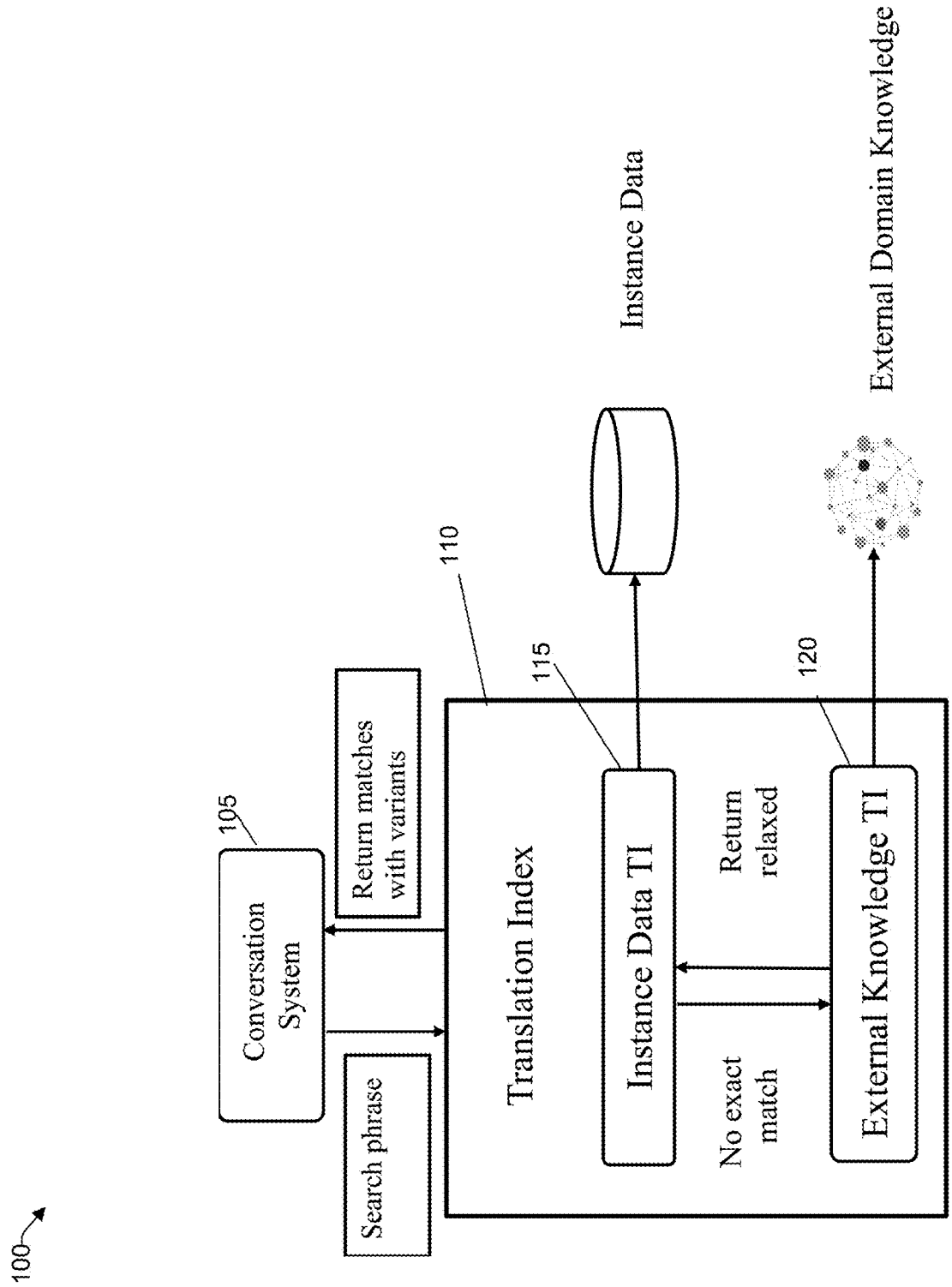
FIG. 1 illustrates an example architecture of a domain specific conversational system utilizing query relaxation, consistent with an illustrative embodiment.

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

In one aspect, the present disclosure relates to a query relaxation method and system that leverages external knowledge sources to expand the domain vocabulary for domain-specific conversational systems. In domain-specific conversational systems, query relaxation is a technique in which a query in a natural language is transformed to represent the user's intent. Instead of returning empty answers (e.g. "not found") to a user, query relaxation is a technique used in which the retrieved response is broadened to return some or more answers. Query relaxation techniques can execute the most restrictive version of a query first, followed by a relaxing of the query until a predetermined threshold of number of hits are returned. However, query relaxation tends to reduce the precision and the recall as the search becomes less restrictive. In the case of domain-specific conversational systems, which may search external knowledge sources and utilize a deep domain understanding to ensure query answering with high precision and recall, query relaxation techniques can reduce the precision and recall of a search. Illustrative embodiments of a query relaxation method and system are provided herein that better represent the user's intent to provide high precision and recall.

The query relaxation method has two phases, the offline external knowledge source adaptation and the online query relaxation. The discussion herein provides illustrative examples of customizing and including an external knowledge source in a query relaxation system and method.

In the offline adaption phase, additional application-specific relationships can be introduced to the adapted external knowledge source. More specifically, an additional edge is introduced to a pair of concepts in response to the following conditions are satisfied: (1) two instance-concepts are not connected directly (e.g., one-hop neighbor), (2) one of the concepts is an ancestor of the other, (3) at least one (or both) concept(s) are marked with a flag (provided in the given knowledge base KB), and (4) the semantic similarity exceeds a predefined threshold. As a result, a pair of concepts can become one-hop neighbors with respect to the application. A newly introduced edge is then encoded with the computed similarity score such that the original semantic data between the two concepts is preserved. Thus, the concepts from the original KB have become closer, making them more reachable. Moreover, through the use of the offline adaptation phase, the similarity scores are ready without introducing an unnecessary delay in the online query relaxation phase.

By virtue of the concepts discussed herein, various aspects of the present disclosure provides for an improvement in computer operation and in another technology (e.g. conversational systems such as those utilizing query relaxation in domain-specific searching). For example, the various aspects, as discussed herein, improve computer operation by reducing the utilization of resources associated with domain-specific searching. Reduced CPU cycles, reduced memory usage, and less network utilization are provided. In the technology of conversational systems, various aspects, as discussed herein, provide increased query flexibility without a loss of precision. Reference now is made in detail to the examples illustrated in the accompanying drawings and discussed herein below.

Example Architecture

FIG. 1 illustrates an example architecture 100 of a domain-specific conversational system utilizing query relaxation, consistent with an illustrative embodiment. By understanding domain vocabularies given a search term, a list of semantically-related terms with high precision and high recall are returned. A domain-specific conversation system 105 receives a query. In some cases, the conversation module 105 may have the answer to a query without having to relax the query result. When there is no available answer, the conversation module 105 passes a search phrase to a translation index (TI) 110. The translation index (TI) 110 provides instance data for data values stored in the data stores. A call to the translation index 110 provides "data awareness" to the queries by identifying a term. The instance data (TI) 115 also can include some or all of the variations of the instance data. If there are no exact matches from the instance data 115, the search is sent to a query relaxation service to leverage the external knowledge (TI) 120 which accesses an external domain knowledge to return semantically related matches to the conversation system 105. The conversation system 105 may include but in no way is limited to Watson® Assistant, or other conversational system.

For example, if the query is about Company X Bank, the conversation system 105 can pass the term to the translation index 110 to provide semantically related terms. In one example, the instance data "Company" as a company name is populated with terms that are associated with "Company" to increase flexibility in searching. Thus, the translation index 110 can provide the instance data along with translated terms, and the instance data (TI) 115 in conjunction with external knowledge (TI) 120 may return terms such as "Company X Bank, N.A.", "Company X Bank International Limited", "Company X Bank, India". If there is no exact match, an external knowledge translation index 120 is queried utilizing query relaxation to provide a relaxed return to the query. The external knowledge TI 120 accesses external domain knowledge sources (e.g. Systemized Nomenclature of Medicine-Clinical Terms (SNOMED-CT®), Financial Industry Business Ontology (FIBO)) and provides a relaxed return of the query.

The external knowledge sources are used to empower the query relaxation techniques to generalize or specialize query terms beyond syntactic matching. However, external knowledge sources (such as SNOMED-CT®) are often not customized to the application's requirements. Thus, the use of an external knowledge source without proper adaptation could introduce undesired information into semantically related results. These external knowledge sources are often in the form of taxonomies, ontologies, and semantic networks, such as SNOMED-CT®, and FIBO®.

Example Processes

Figure 2A:
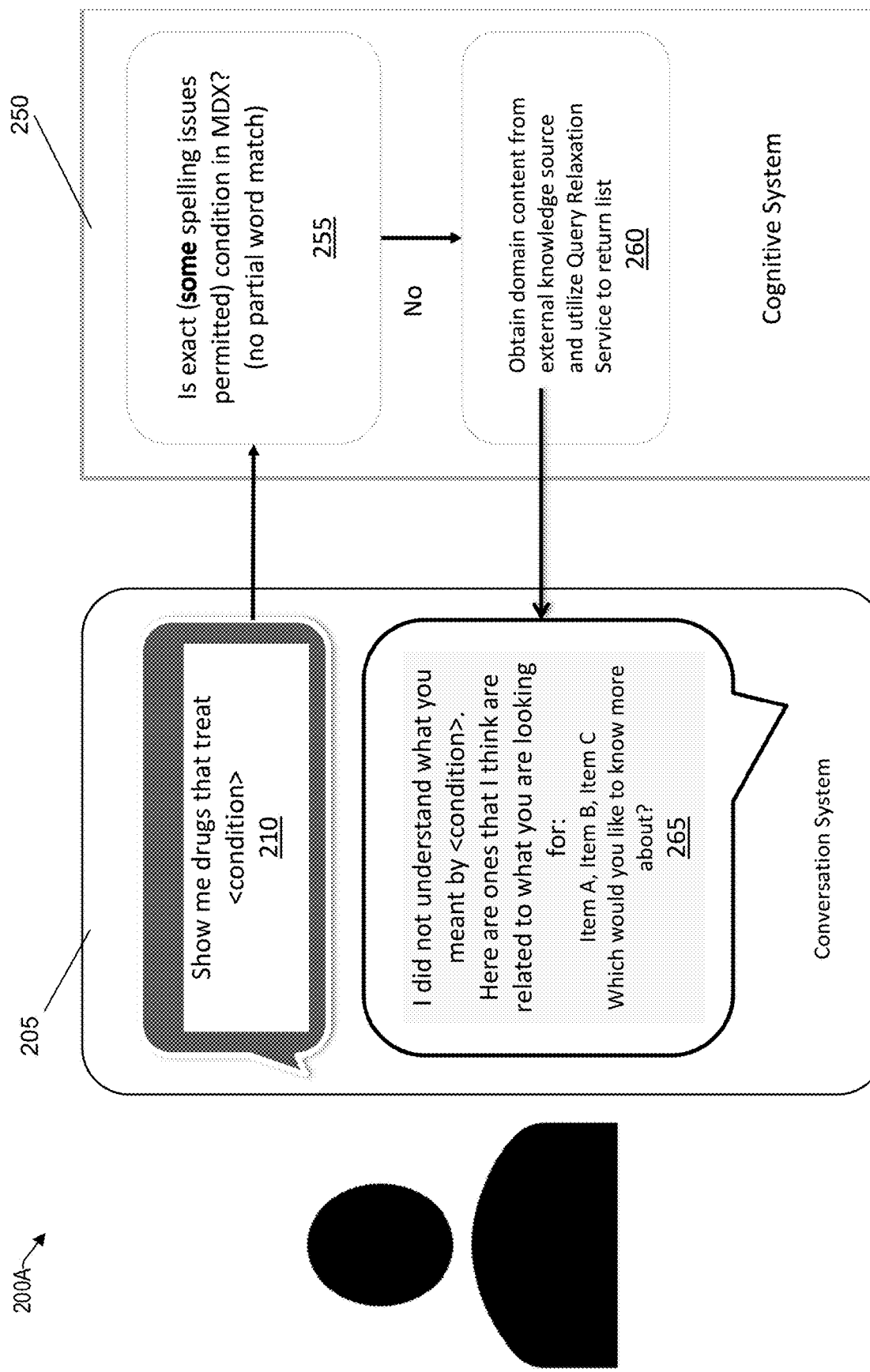
FIG. 2A is an illustration of the general operation of a desired conversation flow, consistent with an illustrative embodiment.
Figure 2B:
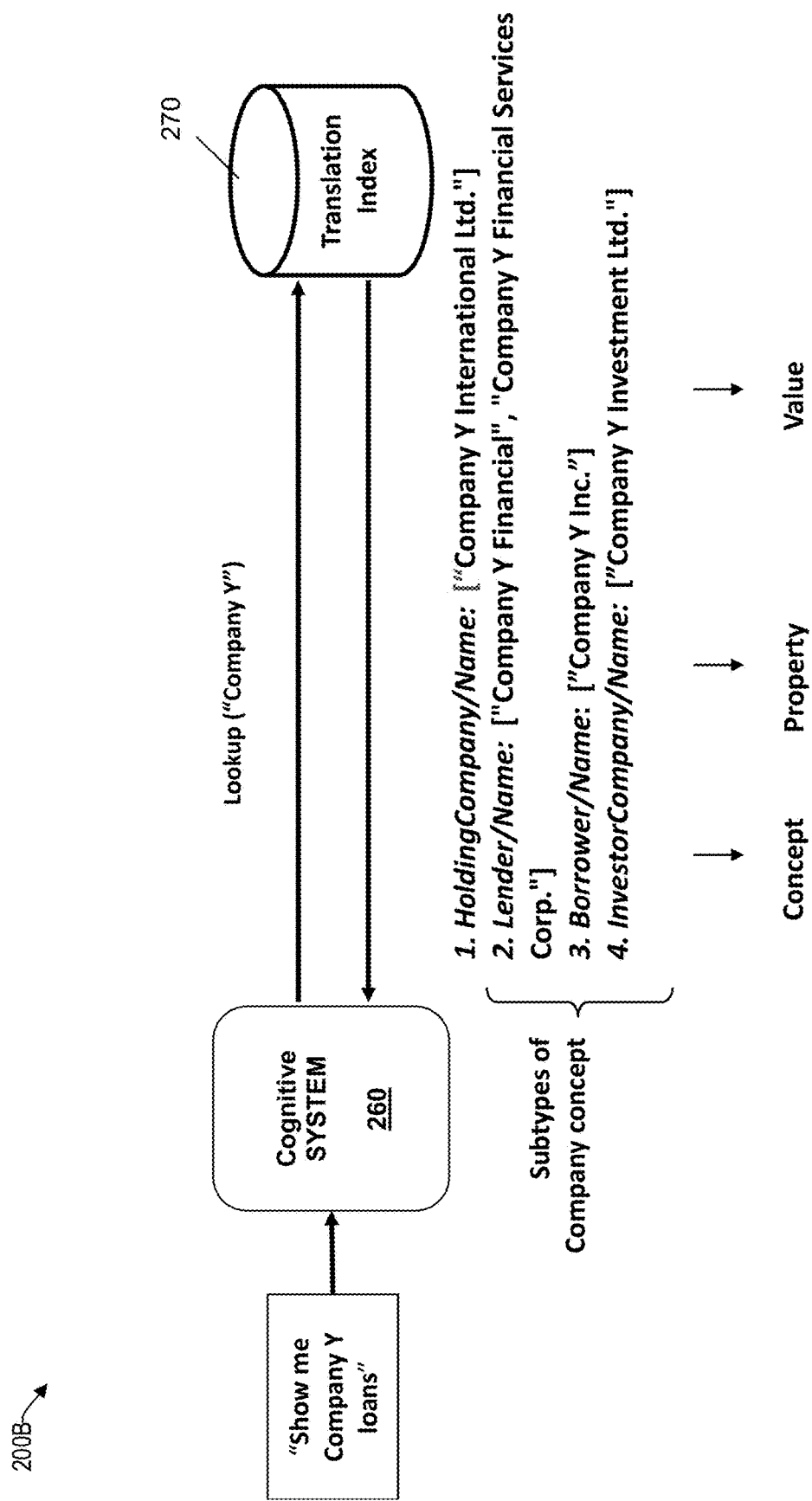
FIG. 2B illustrates an example of capturing instance data, consistent with an illustrative embodiment.
Figure 3:
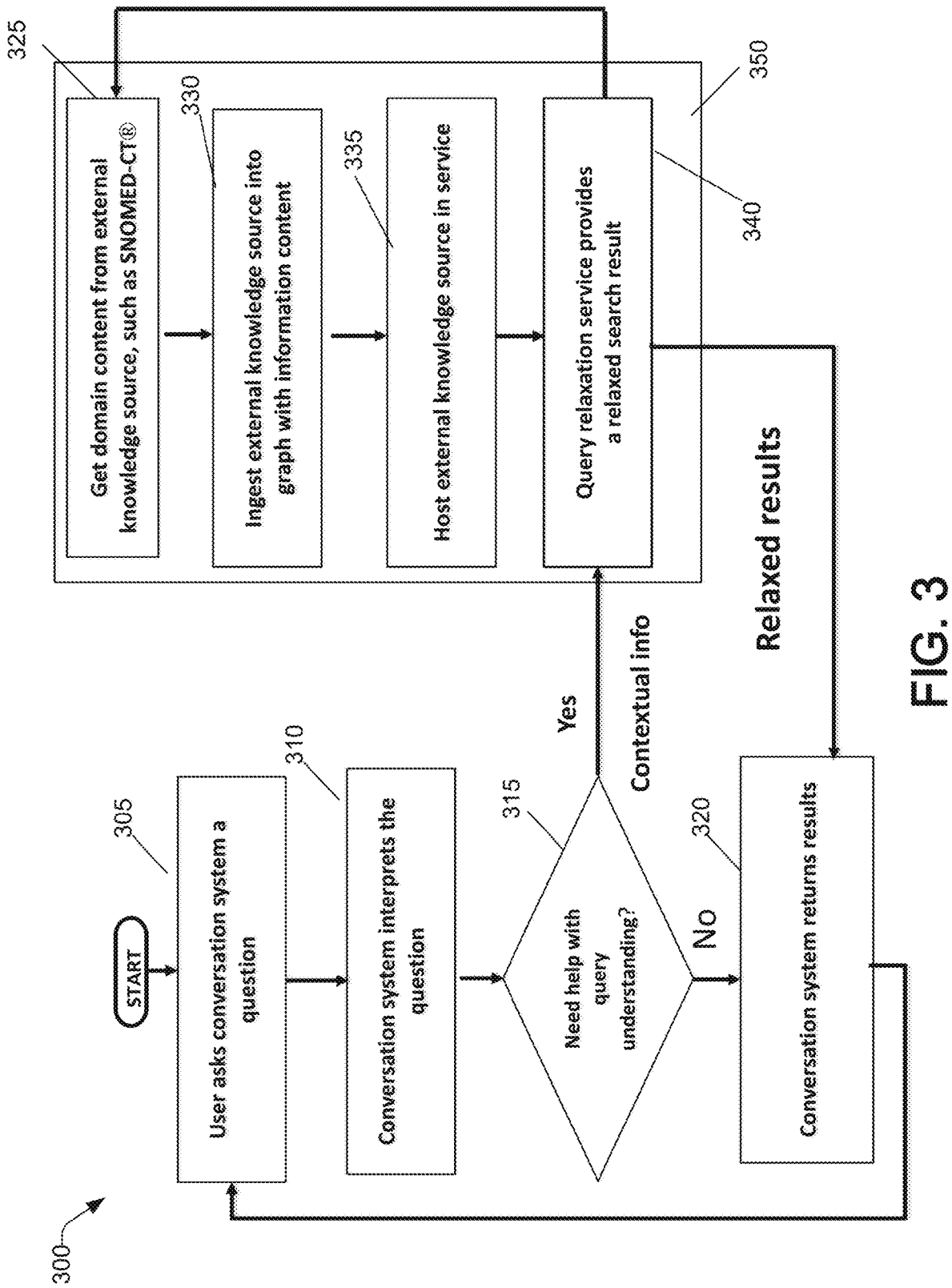
FIG. 3 is a flowchart illustration operation of a domain-specific conversation system communicating with query relaxation system, consistent with an illustrative embodiment.

With the foregoing overview of the example architecture 100, it may be helpful now to consider a high-level discussion of example processes. To that end, FIGS. 2A, 2B, and 3 are illustrative of processes related to various aspects of a domain-specific query relaxation method and system using external domain knowledge for query answering, according to the present disclosure. The processes are illustrated as a collection of blocks in a logical flowchart, which represent a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the processes are described with reference to the architecture 100 of FIG. 1.

FIG. 2A is an illustration of the general operation of a desired conversation flow consistent with an illustrative embodiment. FIG. 2A shows a desired conversation flow between a user and a system utilizing query relaxation. The conversation system 205 can be a system such as Watson® Assistant. However, it is to be understood that the application of the concepts discussed herein is broad and not limited to any particular conversational system. It is also to be understood that while the queries are generally in natural language that may be spoken or typed, the concepts are also applicable to more structured queries.

As shown in FIG. 2A, a query is made to obtain information to treat an illness or injury. The conversation system 205 receives a query (e.g. show me drugs that treat condition x). The query is received by a Cognitive system 250. At 255, if there is not a partial word match, the cognitive system 250 will utilize a query relaxation service. According to one or more embodiments of the present disclosure, to assist with understanding the query, content is obtained from an external domain knowledge source and processed to return a list of items that are semantically related to the user's query, which is provided to the conversation system 265. Through the operations of leveraging external knowledge sources, such as taxonomies, ontologies, and semantic networks, the domain vocabulary for conversation systems is expanded. While at operation 265, the conversation system 205 will request further clarification by having the user identify at least one of the items, or none, through the leveraging of the external knowledge sources to obtain domain content, the items A, B, and C are higher quality results with increased accuracy with increased high precision and recall.

FIG. 2B illustrates an example of capturing instance data, consistent with an illustrative embodiment. In FIG. 2B, the translation index (TI) 270 provides instance data for indexing data values stored in the data stores. The translation index 270 provides data-awareness to the queries, and mapping from data values to properties in the ontology. Flexible indexing and matching semantics can be based on the concept (entity type).

With further reference to FIG. 2B, if the query "show me Company Y loans" is made, this query is provided to the cognitive system. A TI lookup on a string returns a set of ontology properties along with a corresponding list of matching values for each property. The translation index provides a result showing several subtypes of the company concept. For example, the holding/company name is "Company Y International LTD", the lender name is "Company Y Financial", "Company Y Financial Services Corp.". The borrower name is "Company Y Inc.", and an investment/company name is "Company Y Investment LTD". These results are provided to the cognitive system.

FIG. 3 is a flowchart illustration operation of a domain-specific conversation system communicating with a query relaxation system consistent with an illustrative embodiment. At operation 305, a user asks a conversation system a question. At operation 310, the conversation system interprets the question.

At operation 315, the conversation system requests assistance in understanding the query to obtain contextual information. For example, in conversational systems, the contextual information may have a significant impact on the semantical correctness of the relaxed results. For example, in the case of a question of treating a health condition, a user may ask "what drugs treat psychogenic fever?". If at operation 315, no help is used in understanding the query, then at operation 320, the conversation system returns the results. However, if at operation 315, the conversation system requests help in understanding the query, then the query is processed by the query relaxation service 340 of the cognitive system 350. In an embodiment, the operations 325, 330 and 335 have been performed previous to pre-configure the query relaxation service to perform relaxed searching of, for example, medical terminology. At operation 325, an external knowledge source (e.g. SNOMED-CT®) is utilized to obtain domain content. SNOMED-CT® is an example of an external knowledge source of clinical health terminology. This external knowledge source can be utilized to determine concepts (e.g. top-level/instance concepts), relationships (isA/attribute relationships), and descriptions (definitions/symptoms). The domain content is utilized to find semantically related matches.

In a hierarchical relationship, for example, a hyponymy relation an isA relationship can be built on a relationship between classes and subclasses, example, where one class A may be a subclass of another class B (contrasted with, for example, a hypernym relation (an hasA relationship) that references other types of classes). The domain knowledge obtained from the external knowledge source is arranged in the form of domain ontology/taxonomy.

In query relaxation, the contextual information has a large impact on the semantical correctness of the relaxed results. In this illustrative example, the question asked the conversation system was "what drugs treat psychogenic fever", it is noted that both "hyperpyrexia" and "hypothermia" are similar conditions to "psychogenic fever" in the Systemized Nomenclature of Medicine-Clinical Terms (SNOMED® CT).

However, with regard to providing relaxed results in the context of "treatment", the term "hypothermia" borders on an erroneous result and should not be returned, because hypothermia is the opposite of "hyperpyrexia" and "psychogenic fever". The drugs for "hyperpyrexia" are completely different from the ones for "hypothermia", and could actually cause harm.

At operation 330, the domain content from the external knowledge source is ingested into a graph database with information content. At operation 340, the external knowledge source can be hosted in service, for example, in a knowledge base. At operation 350, the query relaxation service provides the relaxed results to the conversation system.

Alternatively, in an embodiment, the operations 325, 330 and 335 may be performed in real time in response to the query relaxation service receiving the request from the conversation system (the "Yes" at operation 315). In such a case, the query relaxation service will, for example, obtain domain content from the external knowledge source.

Figure 4:
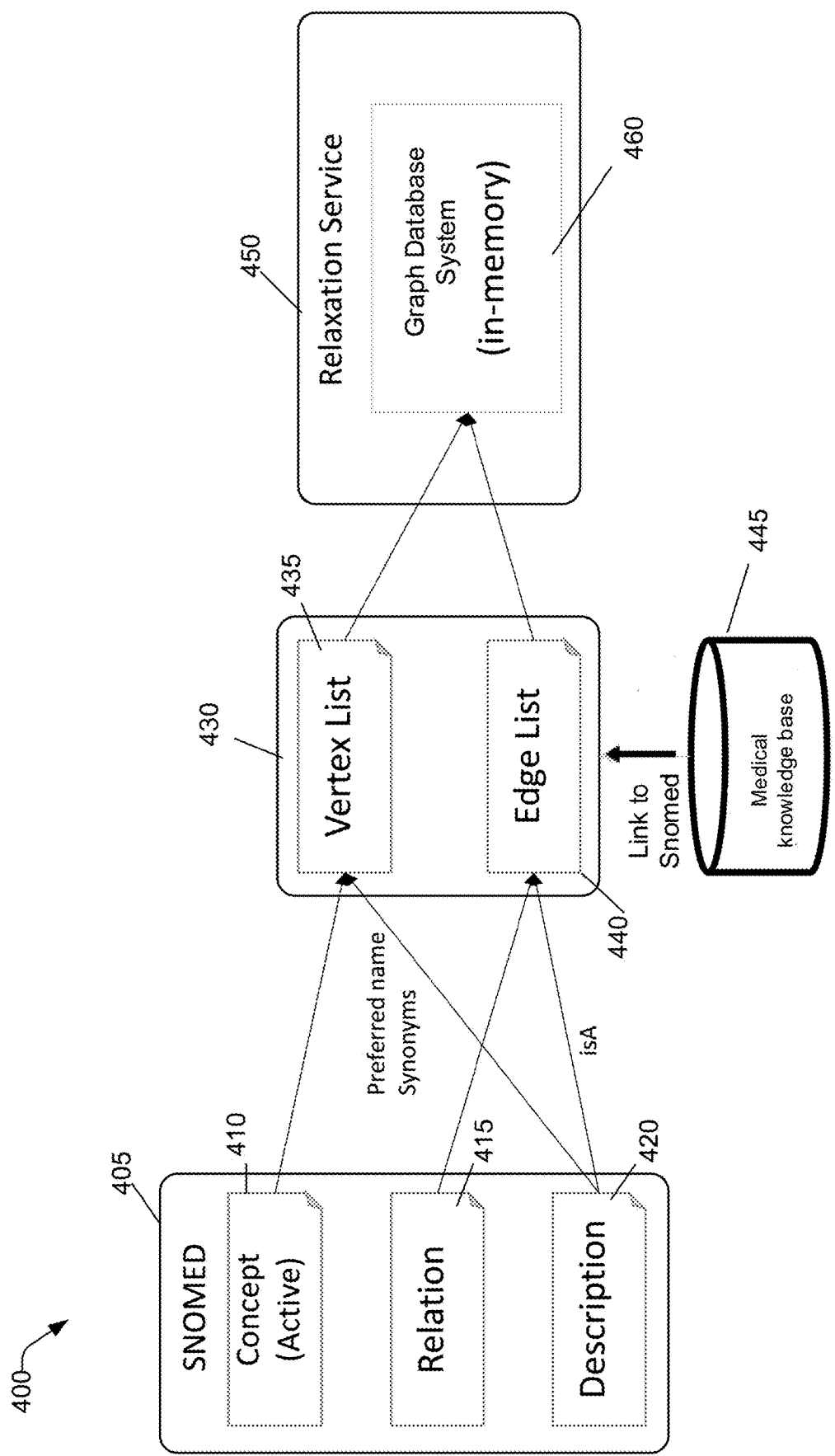
FIG. 4 illustrates an example of ingesting Systemized Nomenclature of Medicine-Clinical Terms into a relaxation service, consistent with an illustrative embodiment.

FIG. 4 illustrates an example of ingesting SNOMED-CT® into a relaxation service consistent with an illustrative embodiment.

With regard to FIG. 3 and FIG. 4, for example, the external knowledge source (SNOMED-CT®) is ingested into a graphical database of the relaxation service. One non-limiting example of such a graphical database is a JanusGraph®.

With reference to FIG. 4, through use of the concepts, relations and description, a list 430 including a vertex list 435 and an edge list 440 are generated/updated and stored in the graph database of the relaxation service 450. The healthcare data 445 is linked to SNOMED-CT®. A scalable graph database 460 is optimized to store and query graphs containing vertices and edges distributed across a multi-machine cluster in a scalable graph database is optimized for storing and querying graphs. For example, in the illustrative embodiment, the scalable graph data 460 includes but is not limited to JanusGraph®, as other types of graphs (e.g. Neo4j) can be used to represent data and the relationships between them.

With reference to FIG. 4, it is shown that the SNOMED-CT® 405 can be grouped in terms of concept, 410, relation 415 and description 420. In the case of SNOMED-CT®, while isA is the dominant relationship, there are at least 19 types of relationships in SNOMED-CT®. Each relationship comes with a description and synonyms. Thus, when ingesting the knowledge source there is also the benefit of including the synonyms from the knowledge source. The synonyms can further extend the domain vocabulary to obtain high precision results and recall.

In one approach to locating search terms, a search term can be located in SNOMED-CT® taxonomy, and a radius-based approached can be used that finds all terms that are within radius r (r hops), identifies the terms that are contained in a medical knowledge database, and return these terms as the related terms to the search term. r can be either predefined or dynamically set, depending on the application. However, the radius-based approach should be supplemented by another approach to provide increased precision and recall of the search by providing a hybrid approach.

The information content (IC) can be calculated to determine how much two nodes have in common. There can be an identification of which terms are more frequently mentioned, and less frequently mentioned, and their relationship through the isA. The relation of intersection (same information) vs union of information may be obtained based on the lowest common ancestor (LCA). The LCA includes every information two nodes share, and the information content is context-aware IC (e.g., adverse effect or dosing). For example, one IC is in the context of how a drug is used to treat a condition, and another IC is in the context of the adverse conditions of the drug. Thus, depending on the context, the same word may have a different meaning, and the precision of the semantically-related terms may be less precise as a result, particularly when the search is expanded. Depending on the context, the content information associated with the specific context is used to provide more accurate results.

Figure 5:
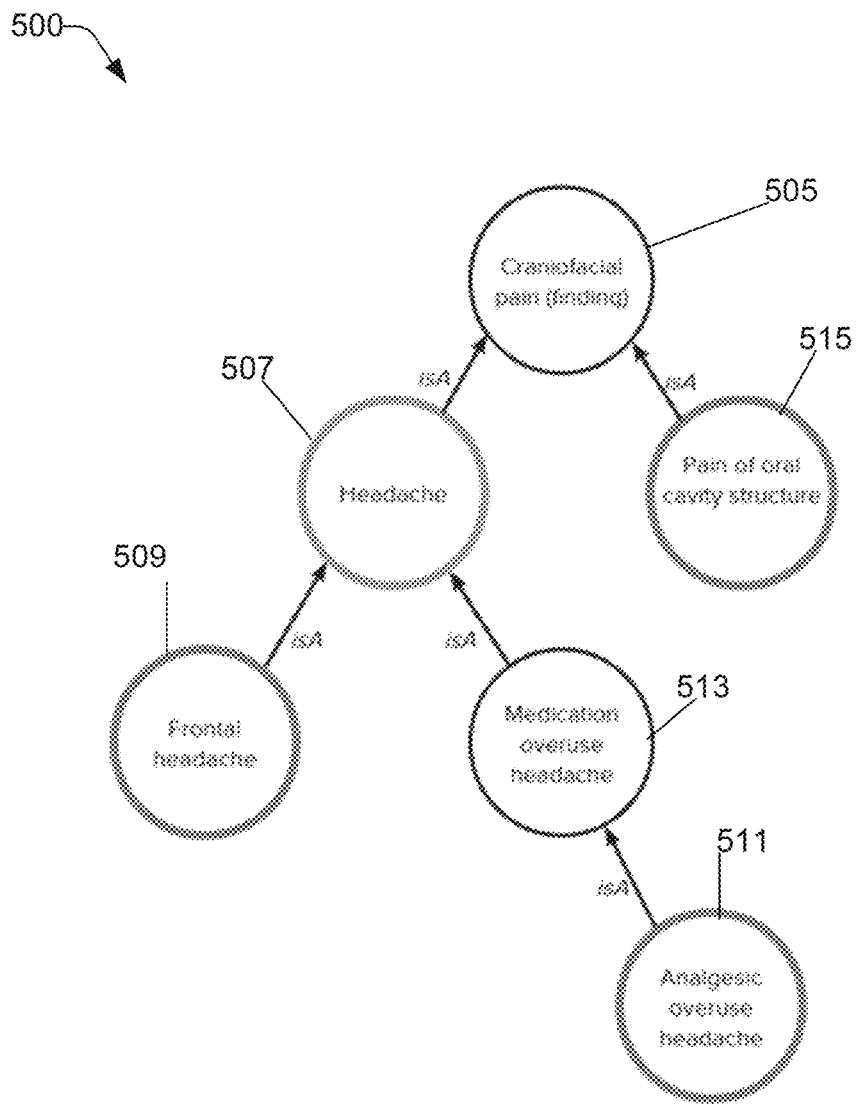
FIG. 5 is an example of a layout of the structural information in isA paths, consistent with an illustrative embodiment.

FIG. 5 is an example of a layout of the structural information in isA paths, consistent with an illustrative embodiment. As shown in FIG. 5, the highest level is craniofacial pain 505, and the various paths that lead there. For example, a path from a front headache 509 leads to generalized headache 507, and then the craniofacial pain 509. In addition, an analgesic overuse headache 511 is a specialized version of the medication overuse headache 513 and still more specialized than the general term headache 509. In both cases, the paths lead to a more general term of headache, and then to still more craniofacial pain 505. A pain of oral cavity structure 515 is a more specialized term than the more general craniofacial pain. Depending on the content of the user's query, some of these paths are a source of noise. Thus, according to an illustrative embodiment, generalization is penalized because it results in a loss of information. An earlier generalization in the path is penalized more than a later one. The similarity result can realize the penalized generalization.

Finally, all of these frequencies are normalized so that their values lie between 0 and 1, which matches the probability of a concept appearing in the corpus. The root concept has the highest normalized frequency of 1, because it is the parent of all concepts in the external knowledge source.

With continued reference to FIG. 5, it can be seen that the pain of an oral cavity structure 515 is the same distance (e.g., 2) from a generalized headache 511 as is the headache from analgesic overuse 513. However, the pain of an oral cavity structure 515 is not as semantically related to a search about a headache and the causes. The following equations can be used to determine the similarity of the terms in the structural information:

$$IC(c) = -\log(freq(c)); \qquad (Eqn. 1)$$

$$freq(c) = |c| + \sum_{i=1}^{n} |c_i|; \qquad (Eqn. 2)$$

$$sim_{IC}(c_1, c_2) = \frac{2 \times IC(lcs(c_1, c_2))}{IC(c_1) + IC(c_2)}; \qquad (Eqn. 3)$$

$$p_{c_1, c_2} = \prod_{i}^{|D|} w_i^{D-i}; \qquad (Eqn. 4)$$

$$sim(c_1, c_2) = p_{c_1, c_2} \times sim_{IC}(c_1, c_2), \qquad (Eqn. 5)$$

where:
IC is the Information Content,
|D| is a distance between instance concept c1 and related concept c2, and
wi is the weight of the $i^{th}$ relationship from c1 to c2.

Figure 6:
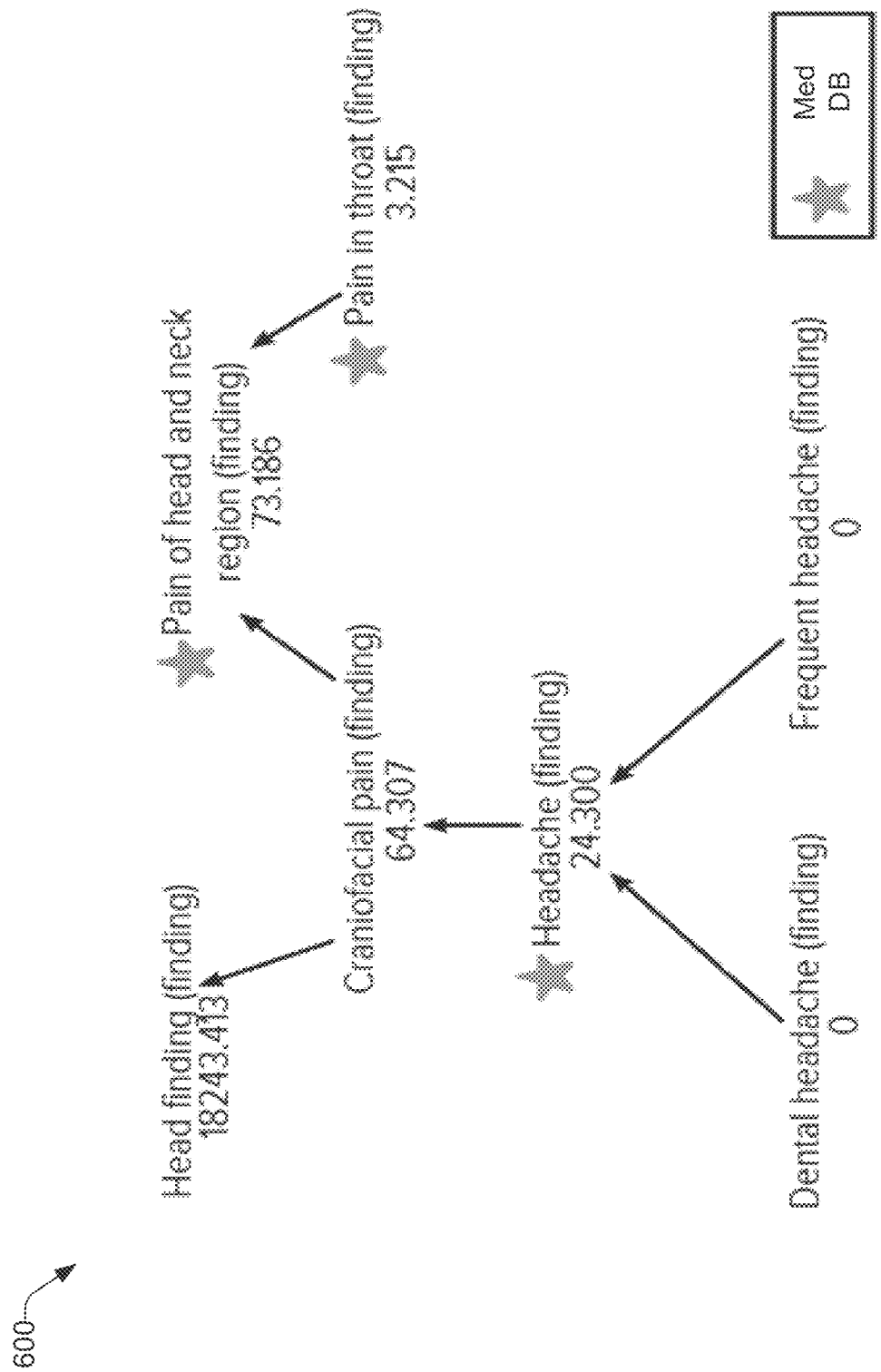
FIG. 6 illustrates a portion of Systemized Nomenclature of Medicine-Clinical Terms with the instance-concept frequency populated, consistent with an illustrative embodiment.

FIG. 6 is snippet of SNOMED-CT® with the instance-concept frequency populated. If a term appears, its parents are considered to appear as well because of the isA relationship. For example, "headache" is the only child of "craniofacial pain", and the frequency of "craniofacial pain" is the frequency of itself, together with the one of "headache". The concepts in red are the ones matching with the data in the given KB. In this case, the final frequency of "pain of head and neck region" is a summation of the frequencies of "craniofacial pain", "pain in throat", and itself. Each concept can be used in two contexts, "Risk" and "Indication". Hence two frequencies are associated with each concept.

FIGS. 7 and 8 are illustrative examples comparing the hybrid approach of the present disclosure with a radius-based approach consistent with an illustrative embodiment. FIG. 7 is an example of the items that are associated with renal impairment, and FIG. 8 lists items associated with depression. It can be seen in FIGS. 7 and 8 that the hybrid approach, by including a similarity metric in addition to a distance (radius), provides for more precise information from the external knowledge source that can be provided as a response to a query result from a conversational system. The radius-based approach includes locating the search term in SNOMED-CT® taxonomy, finding all the terms that are within radius r (r hops), identifying the terms that are contained in a healthcare knowledge base, and returning the terms as the related ones to the search term. However, as can be seen in FIGS. 7 and 8, the radius based approach includes insufficiencies including but not limited to missing semantically related terms vs many (unnecessary) terms, and failing to differentiate the terms with the same distance. The radius based approach exhibits high recall but low precision.

With regard to the hybrid approach, shown in FIGS. 7 and 8, a hybrid similarity measure uses the statistical information of the usage patterns about conditions from text corpus. The structural information from the external knowledge source, the contextual information from the queries, and information content are used to provide semantically-related terms that respond to the query with high precision and high recall, as can be seen by the similarity ratings. In the hybrid approach, word frequency provides the statistical info about conditions. With regard to the structural information, the edges are not created equal. There is a consideration of a hyponymy relation (isA) and a hypernym relation (hasA). The distance from a search term (radius) still matters, and generalization from the search term is disallowed/discounted (see the discussion regarding FIG. 5 and penalization of generalization).

It is to be understood that the inventive concepts of the present disclosure are not limited to application in a particular environment such as healthcare. Healthcare domain ontology has been discussed to illustrate the operation of the query relaxation system and method. The meta-concept "Finding" is connected to both "Indication" and "Risk". In this case, each instance-concept of "Finding" has two concept frequencies corresponding to "Indication" and "Risk". Depending on the query context, one of the concept frequencies is used for query relaxation.

The corpus often may include many documents and each document includes certain number of instance-concepts. One way to account for the sparsity of certain instance-concepts in the corpus, is to adjust further the concept frequency based on the number of documents in which the concept appears. For example, "asthma" is treatable with many drugs (e.g., about 54 drugs in total) according to DrugBank [DrugBank, 2019], whereas "lung cancer" is treatable only by a handful of specialty drugs. Hence, the methods used can alleviate the bias in an effective manner.

Finally, all the instance-concepts may be mapped from the given KB to the external knowledge source. The use of exact string matching algorithms can assist in finding the matching concepts. Approximate string matching algorithms could also be used to provide semantically related terms when there are few or no exact matches.

An offline adaptation method customizes and incorporates external knowledge domain specific knowledge sources into an existing knowledge base (KB) of a cognitive conversation system. Each instance-concept may be used in different contexts depending on the natural language query, and a concept may have completely different semantic meanings in different contexts. For example, a condition treated by a drug is different from an adverse effect caused by the same drug. In this case, having a single frequency associated with a concept would not be sufficient to capture the semantic differences over all possible contexts. To resolve this issue, all the contexts are computed in the domain ontology where an instance-concept can be used and collect the concept frequency with respect to each context. The online query relaxation phase chooses the appropriate concept frequency according to the query context.

In an embodiment, an external knowledge source consists of the hypernym-hyponym relationships (hasA and isA) between instance-concepts. Hyponym (isA) relationships often cause information loss as it leads to more generalized concepts. In this case, solely relying on the IC measure with contextual information can be insufficient as it cannot differentiate the semantic difference hidden in hypernym-hyponym relationships. This issue is addressed by assigning different weights to isA and hasA relationships in the external knowledge source. The weight of a path connecting two instance-concepts c1 (search concept) and c2 (related concept) is thus computed as follows:

$$p_{c_1,c_2} = \prod_i |w_i^{D-i}|;\qquad\text{(Eqn. 4)}.$$

Referring to equation 4 above, |D| is a distance between instance concept c1 and related concept c2 is and wi is the weight of the $i^{th}$ relationship from c1 to c2. The results for the calculated weight of a path for each two instance concepts are based on similarity scores, and the relaxed results are output in which the similarity scores are a highest range of results.

Example Computer Platform

Figure 9:
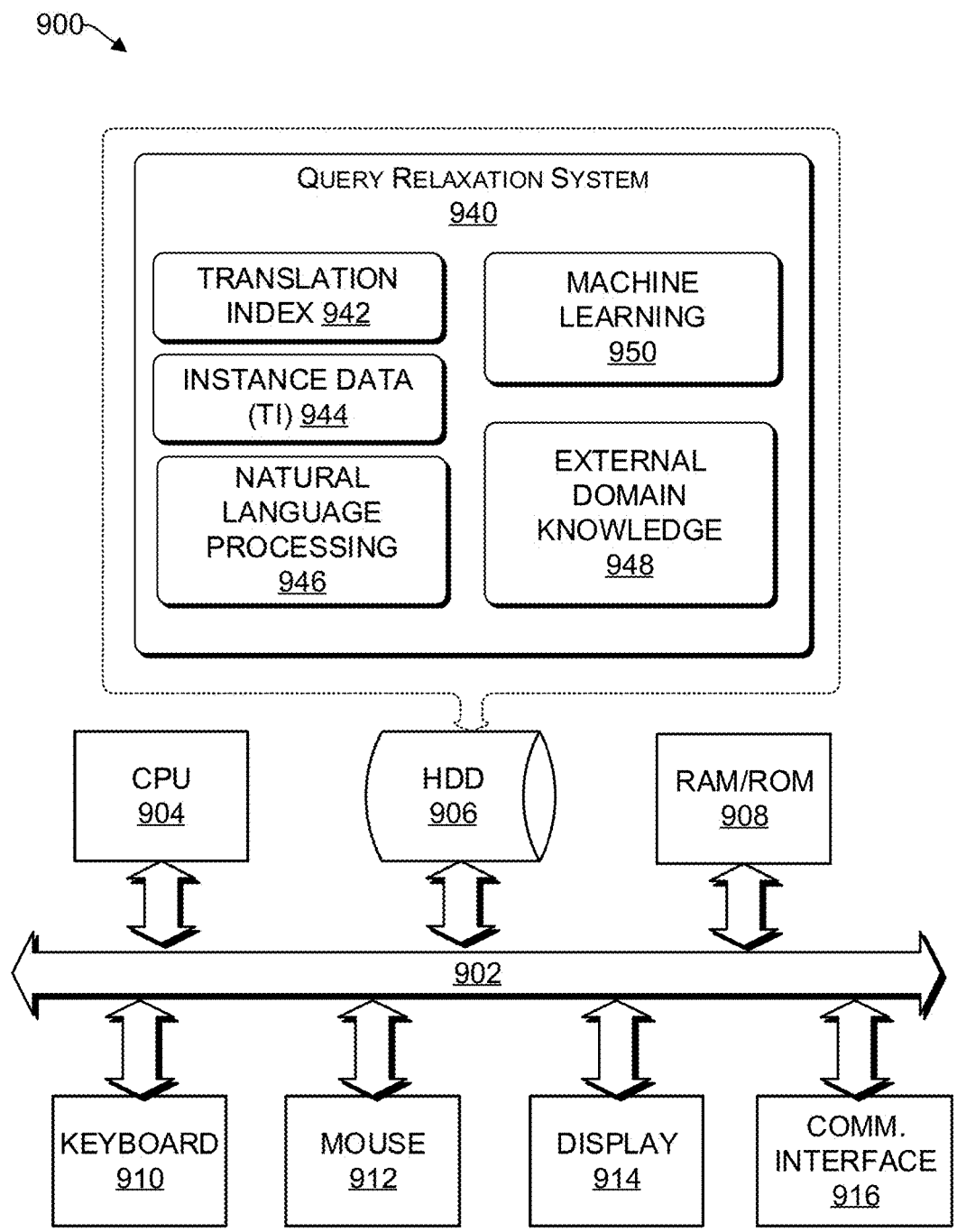
FIG. 9 is a functional block diagram illustration of a computer hardware platform that can communicate with various networked components, consistent with an illustrative embodiment.

As discussed above, functions relating to performing a query relaxation system and method can be performed with the use of one or more computing devices connected for data communication via wireless or wired communication, as shown in FIG. 1 and in accordance with the processes 300 of FIG. 3. FIG. 9 provides a functional block diagram illustration of a computer hardware platform that is capable of communicating with a conversational system as discussed herein. In particular, FIG. 9 illustrates a network or host computer platform 900, as may be used to implement the query relaxation system of FIG. 1.

The computer platform 900 may include a central processing unit (CPU) 904, a hard disk drive (HDD) 906, random access memory (RAM) and/or read only memory (ROM) 908, a keyboard 910, a mouse 912, a display 914, and a communication interface 916, which are connected to a system bus 902.

In one embodiment, the HDD 906, has capabilities that include storing a program that can execute various processes, such as the query relaxation system 940, in a manner described herein. The query relaxation system 940 may have various modules configured to perform different functions. The HDD 906 can include data stores.

For example, there may be a translation index module 942 that is operative to receive queries from sources such as various types of conversational systems, and an instance data module 944 that executes a search for instance data as discussed herein above.

In one embodiment, there is an optional natural language processing (NLP) module 946 operative to process the raw natural language content of each query. The reason the NLP module 946 is optional is that the conversation system may initially perform the natural language processing of the user's query. There can be an external domain knowledge module 948 operative to interface with external domain systems and search for and provide semantically-related terms to a conversational system that received a query. There may be a machine learning module 950 operative to learn from prior interactions with one or more domain-specific queries, during a training phase.

In one embodiment, a program, such as Apache™, can be stored for operating the system as a Web server. In one embodiment, the HDD 906 can store an executing application that includes one or more library software modules, such as those for the Java™ Runtime Environment program for realizing a JVM (Java™ virtual machine).

Example Cloud Platform

Figure 10:
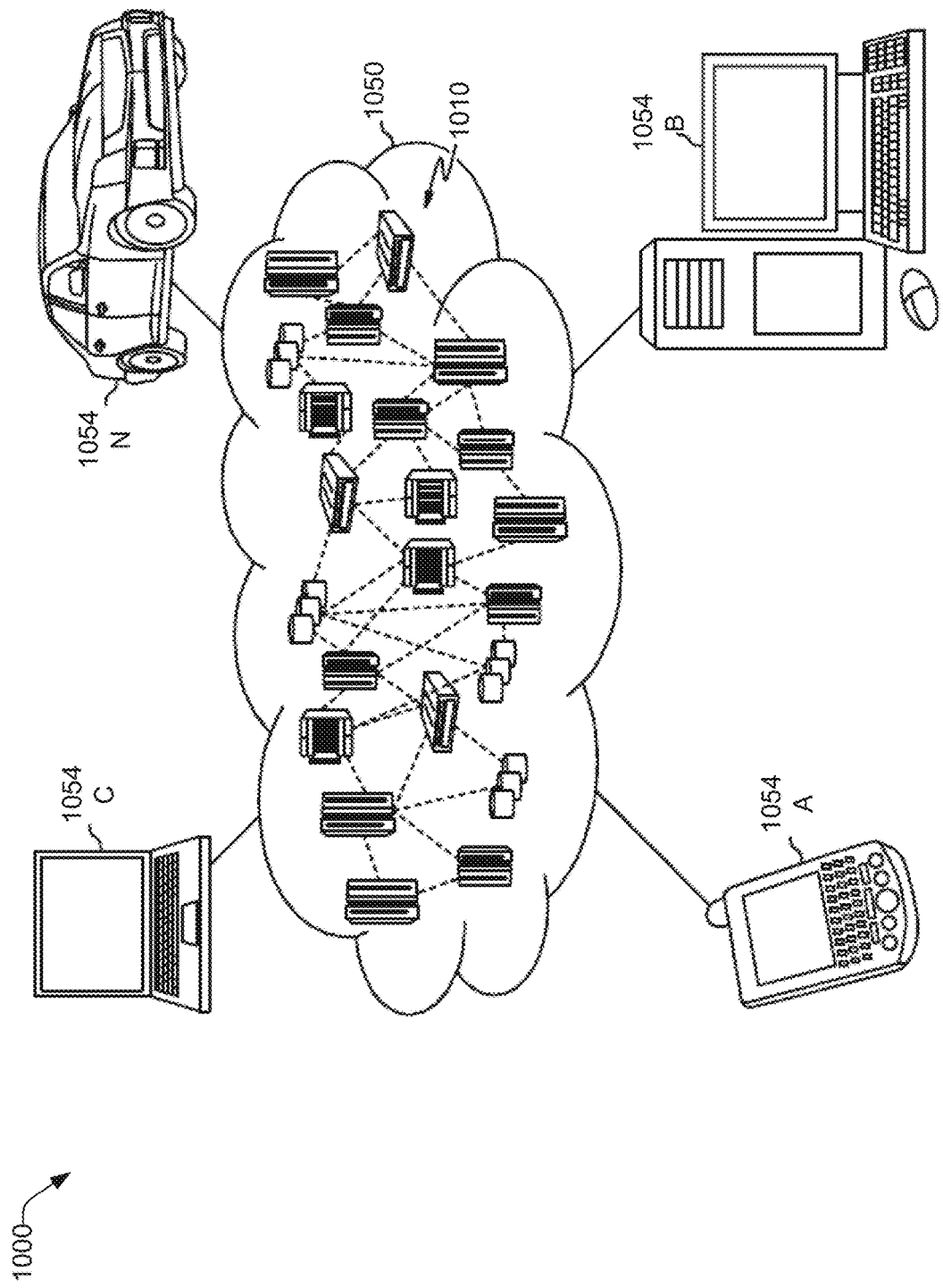
FIG. 10 depicts a cloud computing environment, consistent with an illustrative embodiment.

As discussed above, functions relating to managing the query relaxation system and method may include a cloud 1050 (see FIG. 10). It is to be understood that although this disclosure includes a detailed description on cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, an illustrative cloud computing environment 1000 utilizing cloud computing is depicted. As shown, cloud computing environment 1000 includes cloud 1050 having one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
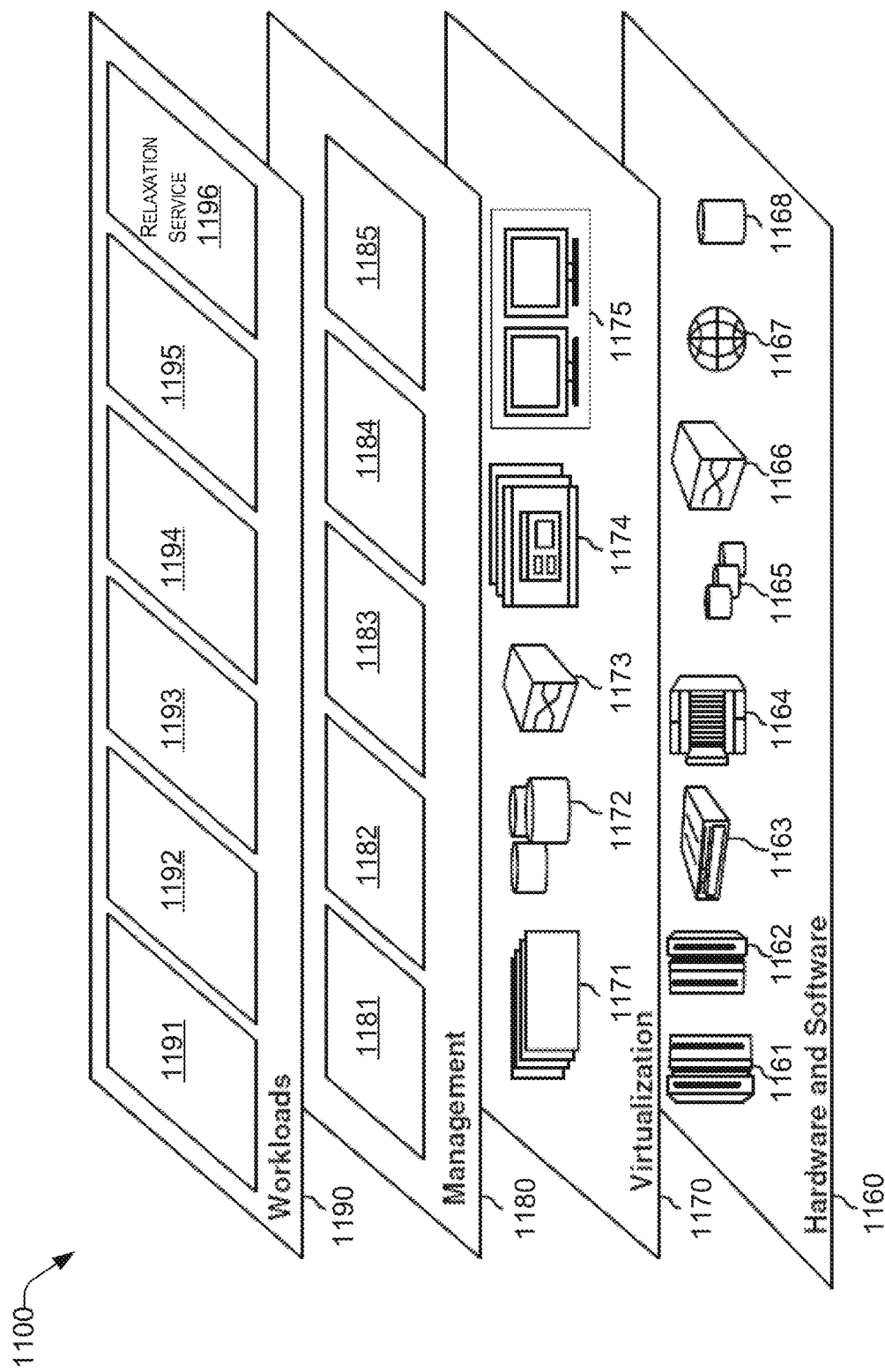
FIG. 11 depicts abstraction model layers, consistent with an illustrative embodiment.

Referring now to FIG. 11, a set of functional abstraction layers provided by cloud computing environment 1000 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1160 include hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and operating a query relaxation service 1196, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. An offline adaptation method of customizing and incorporating external knowledge domain specific knowledge sources into an existing knowledge base (KB) of a cognitive conversation system, the method comprising:
   obtaining an instance-concept frequency from the existing KB;
   computing all the contexts of a domain ontology in which an instance-concept is used; and
   mapping all instance-concepts from the existing KB to an external domain-specific knowledge source,
   wherein the existing KB is configured to search for semantically related terms in response to a natural language query received from a conversation system.

2. The method according to claim 1, further comprising:
   adjusting the instance-concept frequency based on a quantity of documents in which the instance-concept appears.

3. The method according to claim 1, wherein the external domain-specific knowledge source includes data in a form of at least one of taxonomies, ontologies, or semantic networks.

4. The method according to claim 1, further comprising ingesting the external domain-specific knowledge source into a graphic database.

5. The method according to claim 1, wherein the external domain-specific knowledge source is grouped in terms of concept, relation, and description.

6. A non-transitory computer readable storage medium tangibly embodying a computer readable program code having computer readable instructions that, when executed, cause a computer device to execute a method of customizing and incorporating external knowledge domain specific knowledge sources into an existing knowledge base (KB) of a cognitive conversation system, the method comprising:

obtaining an instance-concept frequency from the existing KB;

computing all the contexts of a domain ontology in which an instance-concept is used; and mapping all instance-concepts from the existing KB to an external domain-specific knowledge source, wherein the existing KB is configured to search for semantically related terms in response to a natural language query received from a conversation system.

7. The non-transitory computer readable storage according to claim 6, further comprising:

adjusting the instance-concept frequency based on a quantity of documents in which the instance-concept appears.

8. The non-transitory computer readable storage according to claim 6, wherein the external domain-specific knowledge source includes data in a form of at least one of taxonomies, ontologies, or semantic networks.

9. The non-transitory computer readable storage according to claim 6, further comprising ingesting the external domain-specific knowledge source into a graphic database.

10. The non-transitory computer readable storage according to claim 6, wherein the external domain-specific knowledge source is grouped in terms of concept, relation, and description.

* * * * *